United States Patent
Sung

(10) Patent No.: US 10,793,059 B2
(45) Date of Patent: Oct. 6, 2020

(54) HEADLAMP CONTROL APPARATUS AND METHOD

(71) Applicant: HYUNDAI MOBIS CO., LTD., Seoul (KR)

(72) Inventor: Jun Young Sung, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 16/578,722

(22) Filed: Sep. 23, 2019

(65) Prior Publication Data

US 2020/0139878 A1    May 7, 2020

(30) Foreign Application Priority Data

Nov. 5, 2018  (KR) .................. 10-2018-0134386

(51) Int. Cl.
| | | |
|---|---|---|
| *B60Q 1/08* | (2006.01) | |
| *B60Q 1/28* | (2006.01) | |
| *B60Q 1/18* | (2006.01) | |
| *F21S 41/43* | (2018.01) | |
| *B60Q 1/14* | (2006.01) | |

(52) U.S. Cl.
CPC ............ *B60Q 1/085* (2013.01); *B60Q 1/143* (2013.01); *B60Q 1/18* (2013.01); *B60Q 1/28* (2013.01); *F21S 41/43* (2018.01); *B60Q 2300/056* (2013.01); *B60Q 2300/41* (2013.01); *B60Q 2300/42* (2013.01)

(58) Field of Classification Search
CPC ...... B60Q 1/08; B60Q 1/085; B60Q 2300/31; B60Q 2300/314; B60Q 2300/41; B60Q 2300/42

USPC .......................................................... 362/466
See application file for complete search history.

(56) References Cited

U.S. PATENT DOCUMENTS

| | | | | |
|---|---|---|---|---|
| 2012/0226412 A1* | 9/2012 | Nakadate | ............... | B60Q 1/143 701/36 |
| 2012/0271511 A1* | 10/2012 | Dierks | .................. | B60Q 1/143 701/36 |

(Continued)

FOREIGN PATENT DOCUMENTS

| | | |
|---|---|---|
| JP | 2016-159709 A | 9/2016 |
| KR | 10-1491343 B1 | 2/2015 |
| KR | 10-2017-0118629 A | 10/2017 |

OTHER PUBLICATIONS

Office Action dated Dec. 9, 2019 in the corresponding Korean Patent Application No. 10-2018-0134386.

*Primary Examiner* — William N Harris
(74) *Attorney, Agent, or Firm* — Knobbe Martens Olson & Bear LLP

(57) ABSTRACT

A headlamp control apparatus may include: an image acquisition unit configured to acquire a forward image of an ego vehicle; and a control unit configured to control light irradiation of a headlamp according to a dark area main region for a position of a front vehicle, which is detected based on the forward image acquired by the image acquisition unit, and dark area margin regions set for left and right sides of the dark area main region, and maintain the width of each of the dark area margin regions at a target distance by controlling the light irradiation of the headlamp according to a target irradiation angle which is decided based on a distance to the front vehicle.

10 Claims, 10 Drawing Sheets

(56) References Cited

U.S. PATENT DOCUMENTS

| | | | |
|---|---|---|---|
| 2013/0218413 A1* | 8/2013 | Tanaka | B60Q 1/143 |
| | | | 701/36 |
| 2015/0051797 A1* | 2/2015 | Ehlgen | B60Q 1/085 |
| | | | 701/49 |
| 2015/0149045 A1* | 5/2015 | Mizuno | B60Q 1/1423 |
| | | | 701/49 |
| 2015/0151669 A1* | 6/2015 | Meisner | G08G 1/161 |
| | | | 701/49 |
| 2017/0043702 A1* | 2/2017 | Park | B60Q 1/085 |
| 2017/0182931 A1* | 6/2017 | Son | B60Q 1/1423 |

* cited by examiner

PRIOR ART

PRIOR ART

HEADLAMP CONTROL APPARATUS AND METHOD

CROSS-REFERENCES TO RELATED APPLICATIONS

The present application claims priority to Korean application number 10-2018-0134386, filed on Nov. 5, 2018, which is incorporated by reference in its entirety.

BACKGROUND OF THE INVENTION

The present invention relates to a headlamp control apparatus and method, and more particularly, to a headlamp control apparatus and method which can control a shadow area of a headlamp.

Headlamps for vehicles have evolved from headlamps that passively illuminate into headlamps that actively illuminate in response to the road and the surrounding environment. Furthermore, headlamps that increase illumination on a dark road and decreases illumination on a bright road are also applied. In addition, a headlamp control technology is applied, which can minimize glare experienced by a driver in a front vehicle which travels in the same direction as an ego vehicle or a driver in a front vehicle such as an oncoming vehicle which approaches the ego vehicle while traveling in the opposite direction of the ego vehicle.

Recently, research is being actively conducted on a variety of intelligent headlamp systems including an adaptive driving beam (ADB) headlamp system. The ADB headlamp system, which is a camera-based headlamp system, operates a high-beam headlight when a camera mounted at the front of a vehicle recognizes no front vehicles or a light source from a front vehicle is not recognized by the camera. However, when a front vehicle is recognized by the camera or a light source from the front vehicle is recognized by the camera, the ADB headlamp system calculates the outermost angle of the front vehicle and operates a low-beam headlight to prevent glare in the area of the front vehicle. Furthermore, the ADB headlamp system operates the high-beam headlight in areas other than the area of the front vehicle. The ADB headlamp system may be divided into a swivel-type headlamp system using a swivel actuator and a matrix-type headlamp system using LED turn-on/off. The ADB headlamp system can improve the forward visibility of the driver in the ego vehicle, and prevent glare for the driver in the front vehicle.

In order to prevent glare for the driver in the front vehicle, a correct glare free area (GFA) or shadow area needs to be set for the front vehicle. At the moment, however, the setting of the shadow area completely relies on a camera image processing algorithm that recognizes a light source from a front vehicle through a camera. Therefore, the setting of the shadow area cannot follow position changes between the ego vehicle and the front vehicle in the environment where the positions of the ego vehicle and the front vehicle rapidly change, due to the limit of the image processing speed of the camera. As a result, the driver in the front vehicle inevitably experiences glare. For this reason, a shadow area margin is added to the left and right sides of the shadow area with respect to the position of the front vehicle, in order to minimize glare experienced by the driver in the front vehicle.

Image processing applied to autonomous driving systems is based on an actually detected object, but the intelligent headlamp systems such as the ADB headlamp system and a high beam assistance (HBA) headlamp system, which aim to improve the convenience of driving at night, detect a front vehicle by recognizing a headlamp light source pair or rear lamp light source pair of the front vehicle, which is operated based on pulse width modulation (PWM). Therefore, the detected position accuracy is considerably low, and an error of the position accuracy increases as the front vehicle is located at a short distance from the ego vehicle. In this case, an error corresponding to a maximum of ±3° may occur.

In the related art, the setting of the shadow area margin is performed by using a fixed angle. Thus, as the front vehicle is located at a short distance from the ego vehicle as illustrated in FIG. 1A, the shadow area margin is decreased to frequently cause glare for the driver in the front vehicle. On the contrary, as the front vehicle is located at a long distance from the ego vehicle as illustrated in FIG. 1A, the shadow area margin is unnecessarily increased to reduce the visibility of the driver in the ego vehicle.

That is, as the front vehicle is located at a short distance from the ego vehicle, the error of position accuracy of the current intelligent headlamp system increases, and the shadow area margin is decreased. Therefore, glare for the driver in the front vehicle occurs more frequently. On the other hand, when the front vehicle is positioned at a long distance from the ego vehicle, the increased shadow area margin may cause a counter margin to reduce the visibility of the driver in the ego vehicle.

The related art of the present invention is disclosed in Korean Patent Registration No. 10-1491343 published on Feb. 6, 2015.

SUMMARY OF THE INVENTION

Embodiments of the present invention are directed to a headlamp control apparatus and method which can improve the accuracy of a detected position of a front vehicle in an intelligent lamp system, and remove the problems that glare for a driver in the front vehicle occurs and the visibility of a driver in an ego vehicle is reduced due to an angle-based shadow area margin control method.

In one embodiment, a headlamp control apparatus may include: an image acquisition unit configured to acquire a forward image of an ego vehicle; and a control unit configured to control light irradiation of a headlamp according to a dark area main region for a position of a front vehicle, which is detected based on the forward image acquired by the image acquisition unit, and dark area margin regions set for left and right sides of the dark area main region, and maintain the width of each of the dark area margin regions at a target distance by controlling the light irradiation of the headlamp according to a target irradiation angle which is decided based on a distance to the front vehicle.

The control unit may decide the target irradiation angle through a determined distance and control the irradiation light of the headlamp, the determined distance being selected as any one of a first distance to the front vehicle, which is acquired according to a first algorithm applied to detect a neighboring object in the daytime, and a second distance to the front vehicle, which is acquired according to a second algorithm applied to detect a neighboring object in the nighttime.

When it is determined that the front vehicle is located at a short distance from the ego vehicle, according to a distance determination condition which is preset in consideration of the first and second distances, the control unit may select the first distance as the determined distance to decide the target irradiation angle.

When it is determined that the front vehicle is located at a long distance from the ego vehicle, according to a distance determination condition which is preset in consideration of the first and second distances, the control unit may select the second distance as the determined distance to decide the target irradiation angle.

The target irradiation angle may include a left width angle of the left dark area margin region and a right width angle of the right dark area margin angle, based on the image acquisition unit, and the control unit may maintain the width of the dark area margin region at the target distance by controlling the left width angle and the right width angle based on the determined distance.

The control unit may calculate the left width angle using a left angle, the determined distance and the target distance, the left angle indicating an angle between a reference axis extended from the image acquisition unit in a longitudinal direction of the ego vehicle and the left boundary of the dark area main region, and calculate the right width angle using a right angle, the determined distance and the target distance, the right angle indicating an angle between the reference axis and the right boundary of the dark area main region.

In another embodiment, a headlamp control method may include: acquiring, by an image acquisition unit, a forward image of an ego vehicle; and controlling, by a control unit, light irradiation of a headlamp according to a dark area main region for a position of a front vehicle, which is detected based on the forward image acquired by the image acquisition unit, and dark area margin regions set for left and right sides of the dark area main region, and maintaining the width of each of the dark area margin regions at a target distance by controlling the light irradiation of the headlamp according to a target irradiation angle which is decided based on a distance to the front vehicle.

In accordance with the embodiments of the present invention, the headlamp control apparatus and method can improve the accuracy of the detected position of the front vehicle through the method of selectively applying distance data in the nighttime or daytime. Furthermore, the headlamp control apparatus and method can constantly maintain the width of the shadow area margin by controlling the light irradiation angle of the headlamp according to the distance from the front vehicle, thereby removing the problems that glare for the driver in the front vehicle is caused when the front vehicle is located at a short distance, and the visibility of the driver in the ego vehicle is reduced when the front vehicle is located at a long distance.

BRIEF DESCRIPTION OF THE DRAWINGS

FIGS. 1A and 113 illustrate a method for controlling a shadow area margin based on angle according to the related art.

DESCRIPTION OF SPECIFIC EMBODIMENTS

Hereafter, a headlamp control apparatus and method in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In the following descriptions, a headlamp in accordance with an embodiment of the present invention may include a headlamp which is applied to an adaptive driving beam (ADB) headlamp system.

Figure 1A:
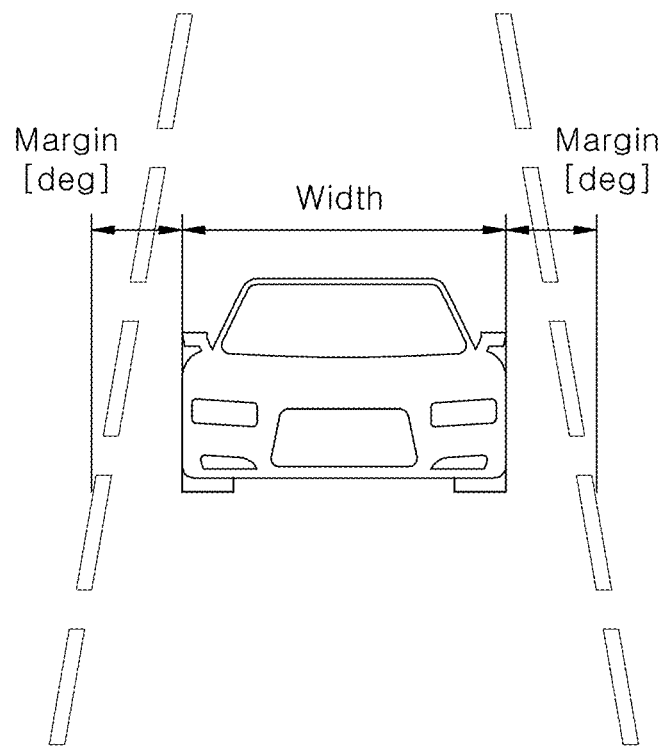
Figure 1B:
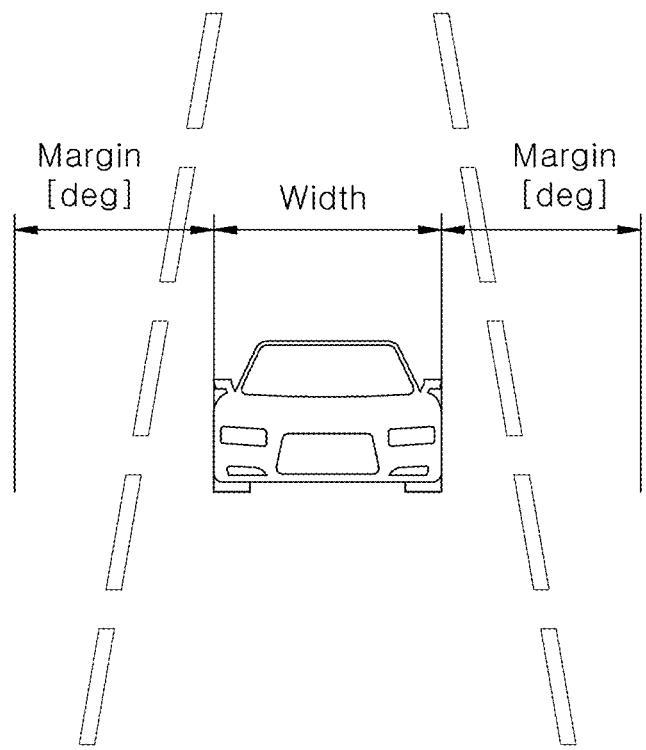
Figure 2:
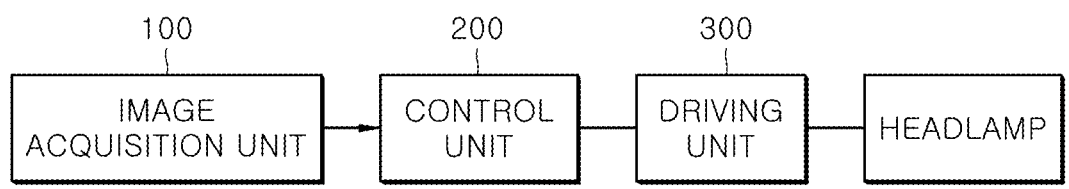
FIG. 2 is a block diagram illustrating a headlamp control apparatus in accordance with an embodiment of the present invention.
Figure 3A:
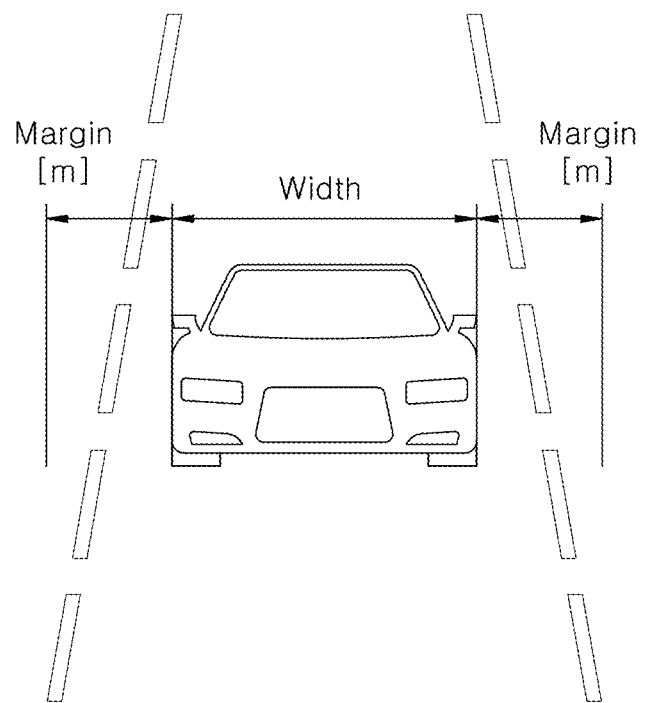
FIGS. 3A and 3B illustrate that the width of a shadow area margin region is maintained at a target distance in the headlamp control apparatus in accordance with the embodiment of the present invention.
Figure 3B:
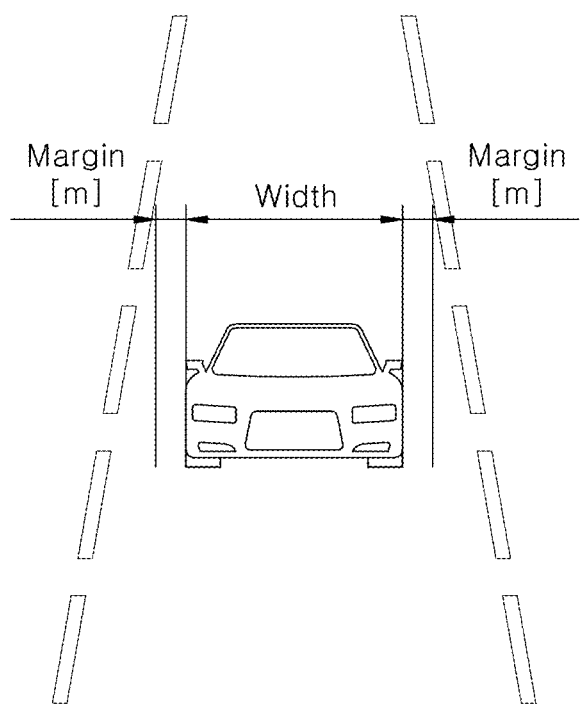
Figure 4:
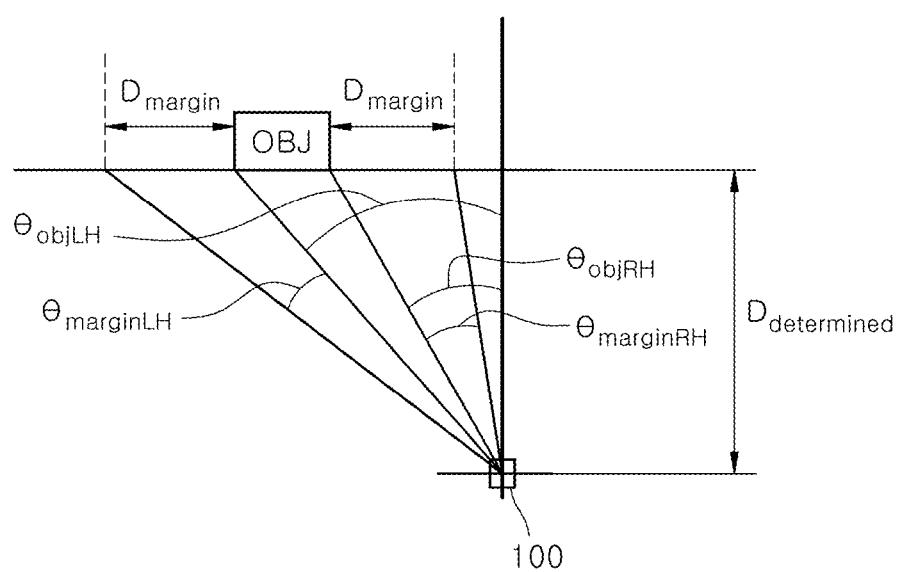
FIGS. 4, 5 and 6 illustrate a process of deciding a target irradiation angle in the headlamp control apparatus in accordance with the embodiment of the present invention.
Figure 5:
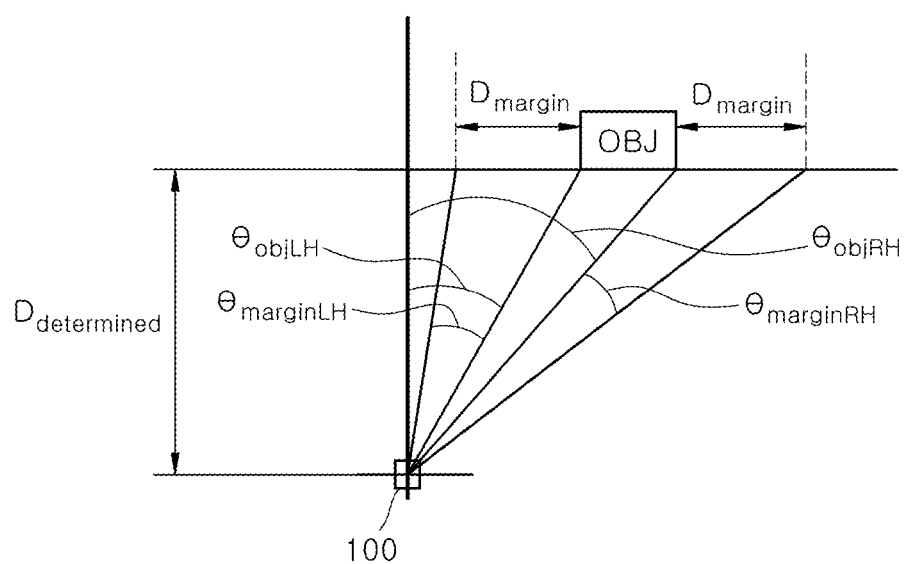
Figure 6:
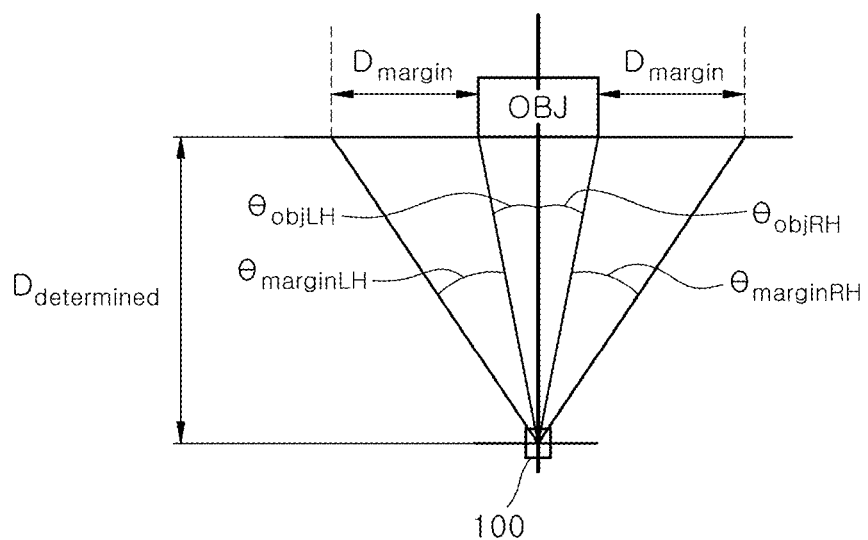

FIG. 2 is a block diagram illustrating a headlamp control apparatus in accordance with an embodiment of the present invention, FIGS. 3A and 3B illustrate that the width of a shadow area margin region is maintained at a target distance in the headlamp control apparatus in accordance with the embodiment of the present invention, and FIGS. 4 to 6 illustrate a process of deciding a target irradiation angle in the headlamp control apparatus in accordance with the embodiment of the present invention.

Referring to FIG. 2, the headlamp control apparatus in accordance with the embodiment of the present invention may include an image acquisition unit 100, a control unit 200 and a driving unit 300.

The image acquisition unit 100 may acquire a forward image of an ego vehicle. The image acquisition unit 100 may be implemented as a camera sensor which detects a front vehicle by acquiring the forward image through a method of recognizing a light source from a front vehicle (nighttime) or a method of recognizing the contrast ratio of the surrounding environment (daytime).

The control unit 200 may control a headlamp to irradiate light, depending on a shadow area main region for the position of the front vehicle, which is determined based on the forward image acquired by the image acquisition unit 100, and shadow area margin regions which are preset for the left and right sides of the shadow area main region. The front vehicle may indicate a front vehicle that travels in the same direction as the traveling direction of the ego vehicle or an oncoming vehicle that travels in the opposite direction of the traveling direction of the ego vehicle and approaches the ego vehicle. The control unit 200 may recognize the light source of the front vehicle in the forward image acquired by the image acquisition unit 100, calculate the outermost angle of the front vehicle to decide a shadow area main region for the position of the front vehicle, and decide shadow area margin regions for the left and right sides of the shadow area main region in order to prevent glare for a driver in the front vehicle. The shadow area margin regions may include a left shadow area margin region and a right shadow area margin region. The control unit 200 may control the light irradiation of the headlamp through the driving unit 300 depending on the shadow area main region and the shadow area margin regions, and the driving unit 300 may be implemented as a swivel actuator or LED driver depending on the headlamp system.

At this time, when a fixed angle is applied to the shadow area margin region as described above, the shadow area margin may be decreased as the front vehicle is located at a short distance from the ego vehicle, and unnecessarily increased as the front vehicle is located at a long distance from the ego vehicle. When the shadow area margin is decreased, glare for the driver in the front vehicle may frequently occur. On the other hand, when the shadow area margin is unnecessarily increased, the visibility of the driver in the ego vehicle may be reduced.

Thus, the headlamp control apparatus in accordance with the present embodiment may employ a configuration in which the control unit 200 controls light irradiation of the headlamp according to a target irradiation angle which is decided based on the distance to the front vehicle, and thus maintains the width of the shadow area margin region at the target distance. The width of the shadow area margin region may indicate an actual distance of the shadow area margin region in the widthwise direction, and meter may be employed as the unit of the width. That is, the width of the shadow area margin region may be fixed to the target distance, in order to remove a counter margin in the related art. FIGS. 3A and 3B illustrate results of the present embodiment in which the shadow area margin region is equally set when the front vehicle is located at a short distance and a long distance from the ego vehicle.

Hereafter, the configuration of the headlamp control apparatus in accordance with the present embodiment will be described in detail, while focusing on the operation of the control unit 200.

The control unit 200 may decide a target irradiation angle through a determined distance and control the light irradiation of the headlamp. The determined distance may be selected as any one of a first distance to the front vehicle, which is acquired according to a first algorithm applied to detect a neighboring object in the daytime, and a second distance to the front vehicle, which is acquired according to a second algorithm applied to detect a neighboring object in the nighttime.

The first distance may indicate a distance to the front vehicle, which is calculated by the first algorithm that detects a neighboring object by recognizing a contrast ratio for a forward image acquired by the image acquisition unit 100, and is typically applied in the daytime. The second distance may indicate a distance to the front vehicle, which is calculated by the second algorithm that recognizes a light source pair from the front vehicle in the forward image acquired by the image acquisition unit 100, calculates a distance by calculating the angle of the light source pair, and is typically applied in the nighttime. Therefore, the first distance calculated by the first algorithm typically has higher accuracy than the second distance calculated by the second algorithm.

The ADB headlamp system may determine the second distance calculated by the second algorithm in the nighttime as the distance to the front vehicle, in order to control light irradiation of the headlamp. Since the light source pair of the headlamp or rear lamp of the front vehicle operates based on PWM, an error is present in the second distance calculated by the second algorithm. As the front vehicle is located at a short distance from the eco vehicle, the error of the second distance may increase.

Thus, the headlamp control apparatus in accordance with the present embodiment may employ a configuration in which the first distance calculated by the first algorithm is utilized to improve the accuracy of the distance to the front vehicle, when the front vehicle can be detected according to the first algorithm based on contrast ratio recognition because the front vehicle is located at a short distance from the ego vehicle even in the nighttime. That is, when the front vehicle is located in a short distance range that the first distance with high accuracy can be utilized, the first distance may be utilized instead of the second distance, in order to improve the accuracy of the distance to the front vehicle.

Specifically, according to a distance determination condition which is preset in consideration of the first and second distances, the control unit 200 may determine whether the front vehicle is located at a short or long distance from the ego vehicle. When determining that the front vehicle is located at a short distance from the ego vehicle, the control unit 200 may select the first distance as the determined distance to decide the target irradiation angle. The determined distance may be defined as a distance to the front vehicle, which is adopted to calculate the target irradiation angle, i.e. a left width angle and a right width angle, which will be described below.

The distance determination condition may be implemented in various manners in such a range that considers the first and second distances. For example, when both of the first and second distances fall within a first reference distance (for example, 70 m), the control unit 200 may determine that the front vehicle is located at a short distance from the ego vehicle. The first reference distance may indicate the maximum distance at which the front vehicle can be detected at a predetermined accuracy or more, even though the first algorithm is applied in the nighttime. Therefore, the first distance may be designed in various manners depending on the specification of the camera sensor, i.e. the image acquisition unit 100.

Therefore, when the front vehicle is located in such a range that guarantees the accuracy of the first distance in the nighttime, the control unit 200 may select the first distance as the distance to the front vehicle, i.e. the determined distance, instead of the second distance, thereby improving the accuracy of the distance to the front vehicle.

On the other hand, when the determination result through the distance determination condition indicates that the front vehicle is located at a long distance from the ego vehicle, the control unit 200 may select the second distance as the determined distance to decide the target irradiation angle. For example, when the first or second distance exceeds the first reference distance, the control unit 200 may determine that the front vehicle is located at a long distance from the ego vehicle. Thus, the control unit 200 may determine that the accuracy of the first distance is not guaranteed, and select the second distance as the determined distance.

After the determined distance is selected, the control unit 200 may decide the target irradiation angle based on the determined distance, and control the light irradiation of the headlamp. The target irradiation angle may indicate the left width angle of the left shadow area margin region and the right width angle of the right shadow area margin region, based on the image acquisition unit 100.

The left width angle may be specifically defined as an angle between a straight line connecting the installation position of the image acquisition unit 100 which is typically installed at the front center of the vehicle to the left boundary of the left shadow area margin region and a straight line connecting the installation position of the image acquisition unit 100 to the left boundary of the shadow area main region (i.e. the boundary between the shadow area main region and the left shadow area margin region). The left width angle may be represented by $\theta_{marginLH}$ in FIGS. 4 to 6.

Similarly, the right width angle may be specifically defined as an angle between a straight line connecting the installation position of the image acquisition unit 100 to the right boundary of the right shadow area margin region and a straight line connecting the installation position of the image acquisition unit 100 to the right boundary of the shadow area main region (i.e. the boundary between the shadow area main region and the right shadow area margin region). The right width angle may be represented by $\theta_{marginRH}$ in FIGS. 4 to 6.

Thus, the control unit 200 may adjust the left width angle and the right width angle based on the determined distance, thereby maintaining the width of the shadow area margin region at the target distance. That is, the control unit 200 may adjust the left width angle and the right width angle such that the width of the shadow area margin region is maintained at the target distance regardless of the distance to the front vehicle.

The process of deciding the target irradiation angle may be described with reference to FIG. 4. The control unit 200 may calculate the left width angle $\theta_{marginLH}$, using a left angle $\theta_{objLH}$, the determined distance $D_{determined}$ and the target distance $D_{margin}$. The left angle $\theta_{objLH}$ may indicate an angle between a reference axis extended from the image acquisition unit 100 in the longitudinal direction of the ego vehicle and the left boundary of the shadow area main region. The left width angle $\theta_{marginLH}$ may be expressed as Equation 1 below.

$$\tan[\theta_{objLH} - \theta_{marginLH}] = \frac{(D_{determined} \times \tan\theta_{objLH}) - D_{margin}}{D_{determined}} \quad \text{[Equation 1]}$$

$$\theta_{marginLH} = \theta_{objLH} - \arctan\left[\frac{(D_{determined} \times \tan\theta_{objLH}) - D_{margin}}{D_{determined}}\right]$$

Similarly, the control unit 200 may calculate the right width angle $\theta_{marginRH}$, using a right angle $\theta_{objRH}$, the determined distance $D_{determined}$ and the target distance $D_{margin}$. The right angle $\theta_{objRH}$ may indicate an angle between the reference axis extended from the image acquisition unit 100 in the longitudinal direction of the ego vehicle and the right boundary of the shadow area main region. The right width angle $\theta_{marginRH}$ may be expressed as Equation 2 below.

$$\tan[\theta_{objRH} + \theta_{marginRH}] = \frac{(D_{determined} \times \tan\theta_{objRH}) + D_{margin}}{D_{determined}} \quad \text{[Equation 2]}$$

$$\theta_{marginRH} = \arctan\left[\frac{(D_{determined} \times \tan\theta_{objRH}) + D_{margin}}{D_{determined}}\right] - \theta_{objRH}$$

The method for calculating the left width angle and the right width angle according to Equations 1 and 2 may be applied in the same manner to FIGS. 5 and 6.

When the left width angle and the right width angle are calculated, the control unit 200 may control the light irradiation of the headlamp according to the left width angle and the right width angle, thereby maintaining the width of the shadow area margin region at the target distance.

Tables 1 and 2 below show that the left width angle and the right width angle are calculated according to the determined distance, when the target distance is 2 m and the left angles are −1° and −3° under the supposition that front vehicles are located at different positions in the horizontal direction based on the ego vehicle. Referring to Tables 1 and 2, the left width angle and the right width angle may decrease in inverse proportion to the determined distance, as the determined distance increases. Thus, the width of the shadow area margin region may be maintained at the target distance of 2 m at all of the determined distances.

TABLE 1

| | | | | | | | | | | | | | | | |
|---|---|---|---|---|---|---|---|---|---|---|---|---|---|---|---|
| $D_{margin}$ [m] | | | | | | | | 2 | | | | | | | |
| $\theta_{objLH}$ [°] | | | | | | | | −1 | | | | | | | |
| $\theta_{objRH}$ [°] | | | | | | | | 3 | | | | | | | |
| $D_{determined}$ [m] | 10 | 20 | 30 | 40 | 50 | 60 | 70 | 80 | 90 | 100 | 110 | 120 | 130 | 140 | 150 |
| $\theta_{marginLH}$ [°] | 11.27 | 5.70 | 3.81 | 2.86 | 2.29 | 1.91 | 1.64 | 1.43 | 1.27 | 1.15 | 1.04 | 0.95 | 0.88 | 0.82 | 0.76 |
| $\theta_{marginRH}$ [°] | 11.17 | 5.67 | 3.79 | 2.85 | 2.28 | 1.90 | 1.63 | 1.43 | 1.27 | 1.14 | 1.04 | 0.95 | 0.88 | 0.82 | 0.76 |

TABLE 2

| | | | | | | | | | | | | | | | |
|---|---|---|---|---|---|---|---|---|---|---|---|---|---|---|---|
| $D_{margin}$ [m] | | | | | | | | 2 | | | | | | | |
| $\theta_{objLH}$ [°] | | | | | | | | −3 | | | | | | | |
| $\theta_{objRH}$ [°] | | | | | | | | 3 | | | | | | | |
| $D_{determined}$ [m] | 10 | 20 | 30 | 40 | 50 | 60 | 70 | 80 | 90 | 100 | 110 | 120 | 130 | 140 | 150 |
| $\theta_{marginLH}$ [°] | 11.17 | 5.67 | 3.79 | 2.85 | 2.28 | 1.90 | 1.63 | 1.43 | 1.27 | 1.14 | 1.04 | 0.95 | 0.88 | 0.82 | 0.76 |
| $\theta_{marginRH}$ [°] | 11.17 | 5.67 | 3.79 | 2.85 | 2.28 | 1.90 | 1.63 | 1.43 | 1.27 | 1.14 | 1.04 | 0.95 | 0.88 | 0.82 | 0.76 |

Tables 3 and 4 below show that the left width angle and the right width angle are calculated according to the determined distance, when the target distance is 3 m and the left angles are −1° and −3° under the supposition that front vehicles are located at different positions in the horizontal direction based on the ego vehicle. Referring to Tables 3 and 4, the left width angle and the right width angle may decrease in inverse proportion to the determined distance, as the determined distance increases. Thus, the width of the shadow area margin region may be maintained at the target distance of 3 m at all of the determined distances.

TABLE 3

| $D_{margin}$ [m] | | | | | | | | | 3 | | | | | |
|---|---|---|---|---|---|---|---|---|---|---|---|---|---|---|
| $\theta_{objLH}$ [°] | | | | | | | | | −1 | | | | | |
| $\theta_{objRH}$ [°] | | | | | | | | | 3 | | | | | |
| $D_{determined}$ [m] | 10 | 20 | 30 | 40 | 50 | 60 | 70 | 80 | 90 | 100 | 110 | 120 | 130 | 140 | 150 |
| $\theta_{marginLH}$ [°] | 16.31 | 8.51 | 5.70 | 4.28 | 3.43 | 2.86 | 2.45 | 2.15 | 1.91 | 1.72 | 1.56 | 1.43 | 1.32 | 1.23 | 1.15 |
| $\theta_{marginRH}$ [°] | 16.41 | 8.44 | 5.67 | 4.26 | 3.41 | 2.85 | 2.44 | 2.14 | 1.90 | 1.71 | 1.56 | 1.43 | 1.32 | 1.22 | 1.14 |

TABLE 4

| $D_{margin}$ [m] | | | | | | | | | 3 | | | | | |
|---|---|---|---|---|---|---|---|---|---|---|---|---|---|---|
| $\theta_{objLH}$ [°] | | | | | | | | | −3 | | | | | |
| $\theta_{objRH}$ [°] | | | | | | | | | 3 | | | | | |
| $D_{determined}$ [m] | 10 | 20 | 30 | 40 | 50 | 60 | 70 | 80 | 90 | 100 | 110 | 120 | 130 | 140 | 150 |
| $\theta_{marginLH}$ [°] | 16.41 | 8.44 | 5.67 | 4.26 | 3.41 | 2.85 | 2.44 | 2.14 | 1.90 | 1.71 | 1.56 | 1.43 | 1.32 | 1.22 | 1.14 |
| $\theta_{marginRH}$ [°] | 16.41 | 8.44 | 5.67 | 4.26 | 3.41 | 2.85 | 2.44 | 2.14 | 1.90 | 1.71 | 1.56 | 1.43 | 1.32 | 1.22 | 1.14 |

Through the above-described process, the width of the shadow area margin region may be constantly maintained at the target distance, which makes it possible to solve the problem that glare for the driver in the front vehicle is caused when the shadow area margin is decreased as the front vehicle is located at a short distance, and the visibility of the driver in the ego vehicle is reduced when the shadow area margin is unnecessarily increased as the front vehicle is located at a long distance.

Figure 7:
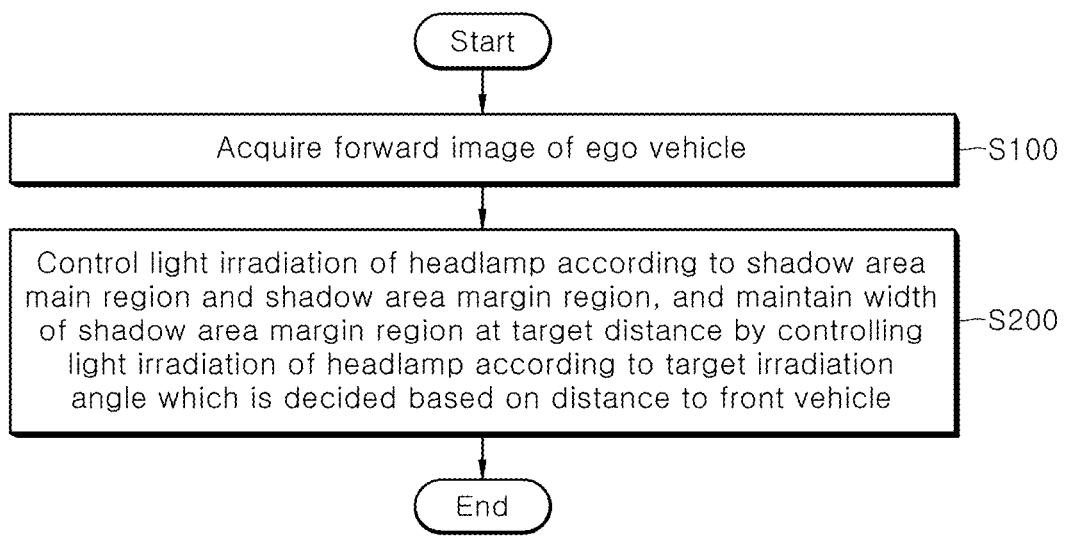
FIGS. 7 and 8 are flowcharts illustrating a headlamp control method in accordance with an embodiment of the present invention.
Figure 8:
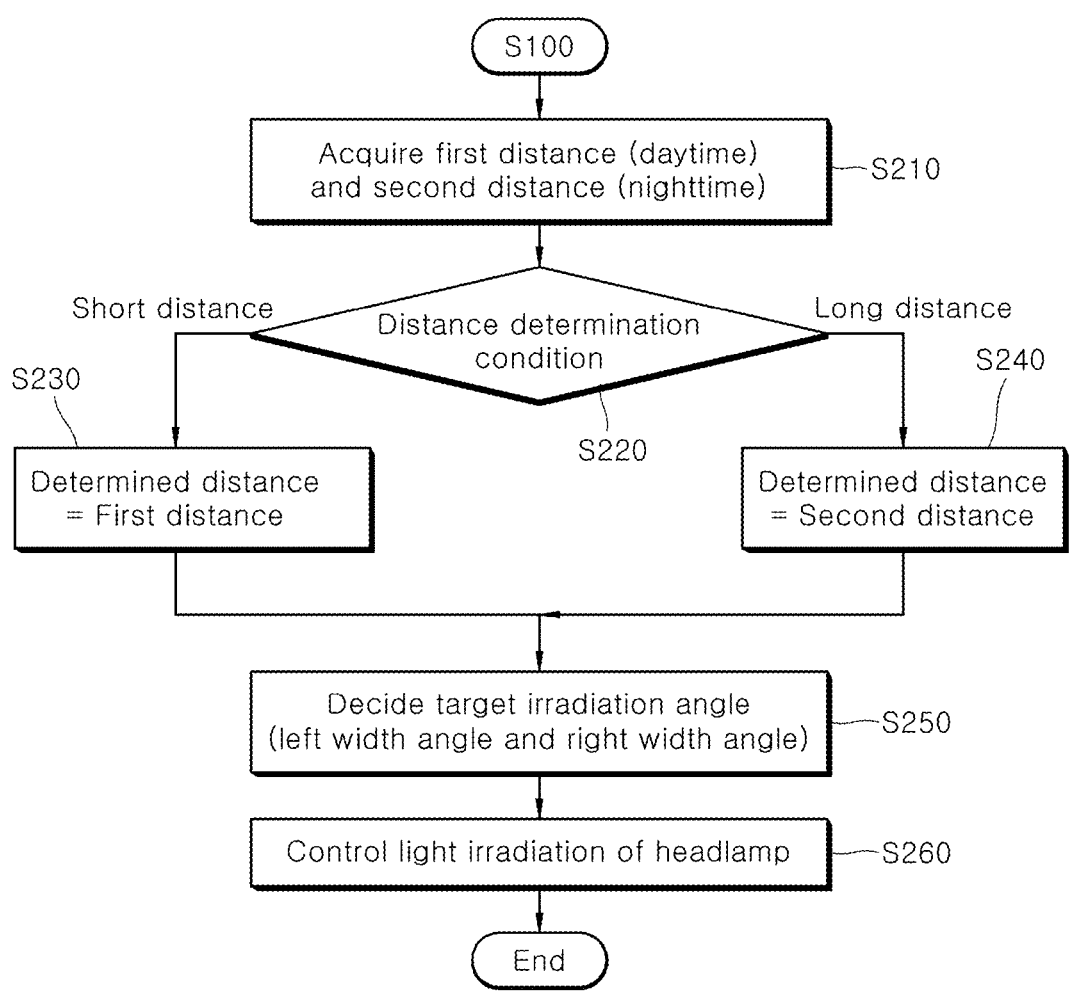

FIGS. 7 and 8 are flowcharts illustrating a headlamp control method in accordance with an embodiment of the present invention.

Referring to FIG. 7, the headlamp control method in accordance with the embodiment of the present invention will be described as follows. First, the image acquisition unit 100 may acquire a forward image of the ego vehicle at step S100.

Then, the control unit 200 control light irradiation of the headlamp depending on a shadow area main region for the position of the front vehicle, which is determined based on the forward image acquired by the image acquisition unit 100, and shadow area margin regions which are preset for the left and right sides of the shadow area main region. At this time, the control unit 200 may control the light irradiation of the headlamp according to a target irradiation angle which is decided based on the distance to the front vehicle, thereby maintaining the width of the shadow area margin region at a target distance, at step S200.

At step S200, the control unit 200 may decide the target irradiation angle through a determined distance, and control the light irradiation of the headlamp. The determined distance may be selected as any one of a first distance to the front vehicle, which is acquired according to a first algorithm applied to detect a neighboring object in the daytime, and a second distance to the front vehicle, which is acquired according to a second algorithm applied to detect a neighboring object in the nighttime.

Specifically, according to a distance determination condition which is preset in consideration of the first and second distances, the control unit 200 may determine whether the front vehicle is located at a short or long distance from the ego vehicle, at step S200. In this case, the control unit 200 may select the first distance as the determined distance when determining that the front vehicle is located at a short distance from the ego vehicle, and select the second distance as the determined distance when determining that the front vehicle is located at a long distance from the ego vehicle.

Then, the control unit 200 may decide the target irradiation angle based on the selected determined distance.

The target irradiation angle may include the left width angle of the left shadow area margin region and the right width angle of the right shadow area margin region based on the image acquisition unit 100. Thus, at step S200, the control unit 200 may adjust the left width angle and the right width angle based on the determined distance, thereby maintaining the width of the shadow area margin region at the target distance.

In this case, the control unit 200 may calculate the left width angle using the left angle, the determined distance and the target distance, the left angle indicating an angle between the reference axis extended from the image acquisition unit 100 in the longitudinal direction of the ego vehicle and the left boundary of the shadow area main region. Furthermore, the control unit 200 may calculate the right width angle using the right angle, the determined distance and the target distance, the right angle indicating an angle between the reference axis and the right boundary of the shadow area main region.

FIG. 8 illustrates a specific implementation of step S200. Referring to FIG. 8, the implementation of step S200 will be described as follows. The control unit 200 may acquire the first distance and the second distance through the first algorithm and the second algorithm, respectively, based on the forward image acquired at step S100, at step S210.

The control unit 200 may determine a distance determination condition which is preset in consideration of the first and second distances at step S220. When the determination result indicates that the front vehicle is located at a short distance, the control unit 200 may select the first distance as the determined distance at step S230. When the determination result indicates that the front vehicle is located at a long distance, the control unit 200 may select the second as the determined distance at step S240.

Then, the control unit 200 may decide the target irradiation angle, i.e. a left width angle and a right width angle, based on the selected determined distance, at step S250.

Then, the control unit 200 may control light irradiation of the headlamp according to the decided target irradiation angle at step S260. Therefore, the width of the shadow area margin region can be constantly maintained at the target distance regardless of the distance from the front vehicle.

In accordance with the embodiments of the present invention, the headlamp control apparatus and method can improve the accuracy of the detected position of the front vehicle through the method of selectively applying distance data in the nighttime or daytime. Furthermore, the headlamp control apparatus and method can constantly maintain the width of the shadow area margin by controlling the light irradiation angle of the headlamp according to the distance from the front vehicle, thereby removing the problems that glare for the driver in the front vehicle is caused when the front vehicle is located at a short distance, and the visibility of the driver in the ego vehicle is reduced when the front vehicle is located at a long distance.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A headlamp system comprising:
   a headlamp; and
   a camera configured to acquire a forward image of an ego vehicle,
   wherein the headlamp system is configured to control light irradiation of the headlamp according to a shadow area main region for a position of a front vehicle, which is detected based on the forward image acquired by the camera, and shadow area margin regions set for left and right sides of the shadow area main region, and maintain a width of each of the shadow area margin regions at a target distance by controlling the light irradiation of the headlamp according to a target irradiation angle which is decided based on a distance to the front vehicle,
   wherein the headlamp system is further configured to decide the target irradiation angle through a determined distance and control the light irradiation of the headlamp, the determined distance being selected as any one of a first distance to the front vehicle, which is acquired according to a first algorithm applied to detect a neighboring object in the daytime, and a second distance to the front vehicle, which is acquired according to a second algorithm applied to detect a neighboring object in the nighttime.

2. The headlamp system of claim 1, wherein when it is determined that the front vehicle is located at a short distance from the ego vehicle, according to a distance determination condition which is preset in consideration of the first and second distances, the headlamp system selects the first distance as the determined distance to decide the target irradiation angle.

3. The headlamp system of claim 1, wherein when it is determined that the front vehicle is located at a long distance from the ego vehicle, according to a distance determination condition which is preset in consideration of the first and second distances, the headlamp system selects the second distance as the determined distance to decide the target irradiation angle.

4. The headlamp system of claim 1, wherein the target irradiation angle comprises a left width angle of the left shadow area margin region and a right width angle of the right shadow area margin angle, based on the camera and
   wherein the headlamp system is configured to maintain the width of the shadow area margin region at the target distance by controlling the left width angle and the right width angle based on the determined distance.

5. The headlamp system of claim 4, wherein the headlamp system is configured to calculate the left width angle using a left angle, the determined distance and the target distance, the left angle indicating an angle between a reference axis extended from the camera in a longitudinal direction of the ego vehicle and the left boundary of the shadow area main region, and calculate the right width angle using a right angle, the determined distance and the target distance, the right angle indicating an angle between the reference axis and the right boundary of the shadow area main region.

6. A headlamp control method of controlling a headlamp system, the method comprising:
   acquiring, by a camera, a forward image of an ego vehicle; and
   controlling light irradiation of a headlamp according to a shadow area main region for a position of a front vehicle, which is detected based on the forward image acquired by the camera, and shadow area margin regions set for left and right sides of the shadow area main region, and maintaining a width of each of the shadow area margin regions at a target distance by controlling the light irradiation of the headlamp according to a target irradiation angle which is decided based on a distance to the front vehicle,
   wherein the headlamp system decides the target irradiation angle through a determined distance and controls the light irradiation of the headlamp, the determined distance being selected as any one of a first distance to the front vehicle, which is acquired according to a first algorithm applied to detect a neighboring object in the daytime, and a second distance to the front vehicle, which is acquired according to a second algorithm applied to detect a neighboring object in the nighttime.

7. The headlamp control method of claim 6, wherein in the controlling of the light irradiation,
   when it is determined that the front vehicle is located at a short distance from the ego vehicle, according to a distance determination condition which is preset in consideration of the first and second distances, the headlamp system selects the first distance as the determined distance to decide the target irradiation angle.

8. The headlamp control method of claim 6, wherein in the controlling of the light irradiation,
   when it is determined that the front vehicle is located at a long distance from the ego vehicle, according to a distance determination condition which is preset in consideration of the first and second distances, the headlamp system selects the second distance as the determined distance to decide the target irradiation angle.

9. The headlamp control method of claim 6, wherein the target irradiation angle comprises a left width angle of the left shadow area margin region and a right width angle of the right shadow area margin angle, based on the camera,
   wherein in the controlling of the light irradiation,
   the headlamp system maintains the width of the shadow area margin region at the target distance by controlling the left width angle and the right width angle based on the determined distance.

10. The headlamp control method of claim 9, wherein in the controlling of the light irradiation, the headlamp system calculates the left width angle using a left angle, the determined distance and the target distance, the left angle indicating an angle between a reference axis extended from the camera in a longitudinal direction of the ego vehicle and the left boundary of the shadow area main region, and calculates the right width angle using a right angle, the determined distance and the target distance, the right angle indicating an angle between the reference axis and the right boundary of the shadow area main region.

* * * * *